US011292882B2

(12) United States Patent
Ohm et al.

(10) Patent No.: US 11,292,882 B2
(45) Date of Patent: Apr. 5, 2022

(54) POLYOLEFIN GEL PROCESSING COMPOSITION CONTAINING AN INORGANIC ACID SCAVENGER AND METHOD USING SAME

(71) Applicant: Celanese Sales Germany GmbH, Taunus (DE)

(72) Inventors: Christian Ohm, Gernsheim (DE); Dominik Schreiber, Wallau (DE)

(73) Assignee: Celanese Sales Germany GmbH, Taunus (DE)

( * ) Notice: Subject to any disclaimer, the term of this patent is extended or adjusted under 35 U.S.C. 154(b) by 187 days.

(21) Appl. No.: 16/360,172

(22) Filed: Mar. 21, 2019

(65) Prior Publication Data

US 2019/0292332 A1 Sep. 26, 2019

Related U.S. Application Data

(60) Provisional application No. 62/647,146, filed on Mar. 23, 2018.

(51) Int. Cl.

| | |
|---|---|
| ***C08J 3/075*** | (2006.01) |
| ***C08K 5/01*** | (2006.01) |
| ***C08K 5/05*** | (2006.01) |
| ***C08K 5/10*** | (2006.01) |
| ***C08K 5/00*** | (2006.01) |
| ***B01D 11/04*** | (2006.01) |
| ***B29C 48/00*** | (2019.01) |
| ***C08K 3/28*** | (2006.01) |
| ***C08L 23/06*** | (2006.01) |
| ***C08K 3/22*** | (2006.01) |
| ***C08K 3/34*** | (2006.01) |
| ***C08K 3/26*** | (2006.01) |
| ***C08K 5/06*** | (2006.01) |
| ***C08L 91/00*** | (2006.01) |
| *B29K 105/00* | (2006.01) |
| *B29K 23/00* | (2006.01) |

(52) U.S. Cl.

CPC ........... *C08J 3/075* (2013.01); *B01D 11/0492* (2013.01); *B29C 48/022* (2019.02); *C08K 3/22* (2013.01); *C08K 3/26* (2013.01); *C08K 3/28* (2013.01); *C08K 3/34* (2013.01); *C08K 5/0016* (2013.01); *C08K 5/01* (2013.01); *C08K 5/05* (2013.01); *C08K 5/06* (2013.01); *C08K 5/10* (2013.01); *C08L 23/06* (2013.01); *C08L 91/00* (2013.01); *B29K 2023/065* (2013.01); *B29K 2105/0061* (2013.01); *C08J 2323/06* (2013.01); *C08K 2003/267* (2013.01); *C08L 2203/12* (2013.01); *C08L 2203/16* (2013.01); *C08L 2207/062* (2013.01); *C08L 2314/02* (2013.01)

(58) Field of Classification Search

CPC ...... C08L 2314/02; C08L 23/06; C08L 91/00; B29K 2023/065; C08K 5/0016; C08J 3/075

USPC ........................................................ 524/424

See application file for complete search history.

(56) References Cited

U.S. PATENT DOCUMENTS

| | | | | |
|---|---|---|---|---|
| 3,351,495 A * | 11/1967 | Larsen | H01M 50/411 | 429/252 |
| 3,775,521 A | 11/1973 | Yamamoto et al. | | |
| 4,704,423 A * | 11/1987 | Iwanami | C08F 6/00 | 524/417 |
| 5,106,563 A * | 4/1992 | Yagi | B29C 55/005 | 264/203 |
| 2003/0193110 A1* | 10/2003 | Yaritz | B29C 48/05 | 264/211 |
| 2004/0054054 A1 | 3/2004 | Blondel | | |
| 2007/0106002 A1 | 5/2007 | Tsujimoto | | |
| 2013/0079483 A1* | 3/2013 | Robert | C08F 10/00 | 526/352 |

FOREIGN PATENT DOCUMENTS

| | | |
|---|---|---|
| CN | 107200908 A | 9/2017 |
| EP | 2725057 A1 | 4/2014 |

OTHER PUBLICATIONS

Ticona, GUR 4130 (Year: 2007).*

PCT International Search Report and Written Opinion Corresponding to Application No. PCT/IB2019/052305 dated Jul. 31, 2019.

Database CA [Online] chemical Abstracts Service, Ohio. Sep. 26, 2017, Wang, Haiyan: "High-Density polyethylene-based material for food storage tank".

* cited by examiner

*Primary Examiner* — Doris L Lee

(74) *Attorney, Agent, or Firm* — Dority & Manning, P.A.

(57) ABSTRACT

A polymer composition for producing gel extruded articles is described. The polymer composition contains polyethylene particles combined with a plasticizer and an acid scavenger. In accordance with the present disclosure, the acid scavenger is an inorganic compound that is insoluble in the plasticizer and/or any extractions solvents used during the process. In one embodiment, the acid scavenger is a magnesium aluminum hydroxide carbonate.

15 Claims, No Drawings

POLYOLEFIN GEL PROCESSING COMPOSITION CONTAINING AN INORGANIC ACID SCAVENGER AND METHOD USING SAME

RELATED APPLICATIONS

The present application is based upon and claims priority to U.S. Provisional Application Ser. No. 62/647,146, having a filing date of Mar. 23, 2018, which is incorporated herein by reference in its entirety.

BACKGROUND

Polyethylene polymers have numerous and diverse uses and applications. For example, high density polyethylenes are valuable engineering plastics, with a unique combination of abrasion resistance, surface lubricity, chemical resistance and impact strength. They find application in the production of high strength fibers for use in ropes and anti-ballistic shaped articles and in the production of other elongated articles, such as membranes for lithium batteries. However, since the flowability of these materials in the molten state decreases as the molecular weight increases, processing by conventional techniques, such as melt extrusion, is not always possible.

One alternative method for producing fibers and other elongated components from polyethylene polymers is by gel-processing in which the polymer is combined with a solvent. The resultant gel is extruded into a fiber or membrane, and may be stretched in one or two directions. Also, part or all of the solvent may be removed from the product.

In the past, however, problems have been experienced in gel-processing polyethylene polymers. For example, polyethylene polymers are typically made with Ziegler Natta catalysts that can contain a certain amount of chlorine. During gel-processing, the chlorine can release from the polymer as hydrochloric acid. Hydrochloric acid is a corrosive gas that can cause damage to processing equipment, such as to the extruder, the pipes, and the like. In the past, in order to prevent acid damage, acid scavengers have been combined with the polyethylene polymer. The acid scavenger reacts with the hydrochloric acid and forms a non-corrosive salt. A typical acid scavenger widely used in the past for polyethylene polymers is calcium stearate. Calcium stearate, however, has to be used in relatively high amounts in order to control the release of acids. In addition, calcium stearate is highly soluble in plasticizers and solvents used during gel processing. During gel processing, the plasticizers and solvents are removed from the final product, collected, and reused. Calcium stearate and other solvent soluble acid scavengers, however, can quickly accumulate within the plasticizer and/or solvent and render them unusable.

In view of the above, a need exists for a polyolefin composition formulated for gel processing that contains a more effective acid scavenger. More particularly, a need exist for an acid scavenger for use in gel processing applications that is highly effective at low concentrations and that is not soluble in plasticizers and/or solvents used during the process.

SUMMARY

In general, the present disclosure is directed to polyolefin compositions well suited for gel processing applications. The polyolefin compositions, for instance, can be used to produce elongated articles, such as films, membranes, fibers, and the like. In one embodiment, a polyethylene, such as a high density polyethylene resin, is combined with a plasticizer to form a gel-like material. In accordance with the present disclosure, the polyethylene resin and plasticizer are further combined with an acid scavenger. The acid scavenger is not only insoluble in the plasticizer, but has also been found to be capable of preventing acid release within the composition at surprising and unexpectedly low concentrations.

For example, in one embodiment, the present disclosure is directed to a polymer composition for producing gel extruded articles. The polymer composition comprises a plasticizer blended with polyethylene resin. The polyethylene resin can be made from a high density polyethylene, such as a high molecular weight polyethylene. In one embodiment, for instance, the resin is made from an ultrahigh molecular weight polyethylene. The polyethylene resin is combined with the plasticizer and an acid scavenger in order to produce a gel-like composition capable of being extruded. In accordance with the present disclosure, the acid scavenger comprises an inorganic compound that is insoluble in the plasticizer. For example, the inorganic compound may comprise an oxide, a carbonate, a silicate, or mixtures thereof. In one particular embodiment, the acid scavenger comprises a carbonate compound such as an aluminum-sodium carbonate. In one particular embodiment, for example, the acid scavenger comprises a hydrotalcite.

As described above, the acid scavenger can be contained in the polymer composition at extremely low concentrations. For example, the acid scavenger can be present in the composition in an amount less than about 250 ppm, such as less than about 200 ppm, such as less than about 150 ppm, such as less than about 100 ppm on a weight basis. Even at the above low concentrations, the acid scavenger can effectively prevent acid from being released from the polymer composition during processing.

In general, the polymer composition contains the high density polyethylene resin in an amount up to about 50% by weight. The plasticizer, for instance, can be present in the composition in an amount greater than about 50% by weight, such as in an amount greater than about 60% by weight, such as in an amount greater than about 70% by weight, such as in an amount greater than about 80% by weight, such as in an amount greater than about 90% by weight. Various different materials can be used as the plasticizer. For instance, the plasticizer may comprise a mineral oil, a paraffinic oil, a hydrocarbon oil, an alcohol, or the like. For instance, the plasticizer may comprise decaline, xylene, dioctyl phthalate, dibutyl phthalate, stearyl alcohol, oleyl alcohol, decyl alcohol, nonyl alcohol, diphenyl ether, n-decane, n-dodecane, or mixtures thereof. In one embodiment, the plasticizer may comprise a C5-C12 hydrocarbon, such as a C5-C12 saturated hydrocarbon. For example, the plasticizer may comprise heptane, hexane, or the like.

In one embodiment, the polyethylene used to produce the particles can have a relatively high molecular weight. In one embodiment, the use of higher molecular weight polyethylene particles may be beneficial, especially in applications where greater strength properties are needed or desired. For example, the polyethylene used to produce the particles can have a molecular weight of greater than about 500,000 g/mol, such as greater than about 1,000,000 g/mol, such as greater than about 1,500,000 g/mol, such as greater than about 2,000,000 g/mol, such as greater than about 2,500,000 g/mol, such as greater than about 3,000,000 g/mol, such as greater than about 3,500,000 g/mol, such as even greater than about 4,000,000 g/mol. In one embodiment, the polyethylene used to produce the particles comprises a Ziegler-Natta catalyzed ultrahigh molecular weight polyethylene.

The present disclosure is also directed to polymer articles formed from the above polymer composition. The polymer articles can be produced through a gel extrusion or gel-spinning process. Polymer articles made in accordance with the present disclosure include fibers, films, membranes, or the like. Because the acid scavenger of the present disclosure is not soluble in the plasticizer or in any extraction solvents used during the process, the acid scavenger remains within the polymer articles after the articles are formed. In this manner, the acid scavenger remains effective even when the polymer articles are in use. Polymer articles made according to the present disclosure, for instance, can contain the acid scavenger generally in an amount greater than about 10 ppm, such as in an amount greater than about 20 ppm, such as in an amount greater than about 30 ppm on a weight basis and generally in an amount less than about 250 ppm.

The present disclosure is also directed to a process for producing polymer articles. The process includes the steps of forming a gel-like composition from the polymer composition described above. The gel-like composition is then extruded through a die to form a polymer article. The polymer article, for instance, may comprise fibers, a film, or a membrane. During formation of the polymer article, at least part of the plasticizer is separated and removed from the polyethylene particle. For instance, in one embodiment, greater than 80%, such as greater than 90%, such as greater than 95%, such as greater than 98% of the plasticizer is removed during formation of the polymer article.

In one embodiment, an extraction solvent, such as dichloromethane is combined with the polymer composition before or during formation of the polymer article. The extraction solvent can be used to facilitate removal of the plasticizer. Of particular advantage, the acid scavenger used in accordance with the present disclosure is insoluble not only in the plasticizer but also in the extraction solvent. Thus, substantially all of the plasticizer can be removed from the polymer article without also removing the acid scavenger.

Other features and aspects of the present disclosure are discussed in greater detail below.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a polymer composition well suited for producing gel extruded articles, such as fibers, films and membranes. The polymer composition contains a polyethylene resin, such as high density polyethylene particles, combined with a plasticizer and an acid scavenger. In accordance with the present disclosure, the acid scavenger comprises an inorganic compound that is insoluble in the plasticizer and/or in an extraction solvent that may be used during the process. In this manner, the acid scavenger does not remain in the plasticizer when the plasticizer is removed from polymer articles and, instead, remains active within the polymer articles for preventing the release of acid, such as hydrochloric acid. It was unexpectedly discovered that the acid scavengers in accordance with the present disclosure can be used at extremely low concentrations and still prevent acid emissions.

As described above, the acid scavenger for use in the present disclosure generally comprises an inorganic compound. The inorganic compound may comprise an oxide, a carbonate, a silicate, or mixtures thereof. For instance, the acid scavenger may comprise a carbonate, such as an aluminum-sodium carbonate. In one embodiment, the acid scavenger comprises a hydrotalcite. In one particular embodiment, the hydrotalcite may have the following chemical formula:

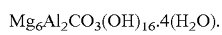

$$Mg_6Al_2CO_3(OH)_{16}.4(H_2O).$$

In other embodiments, the acid scavenger may comprise a metal oxide, such as magnesium oxide, zinc oxide, or mixtures thereof. Other acid scavengers that may be used include sodium carbonate, calcium carbonate, other hydroxy metal carbonates, aluminum silicate, and the like.

The acid scavenger, such as a hydrotalcite, may optionally be coated. Example coatings include fatty acids (e.g., higher fatty acids), anionic surfactants, phosphates, coupling agents, and esters of polyhydric alcohols and fatty acids. Specific examples in some embodiments include higher fatty acids having 10 or more carbon atoms such as stearic acid, erucic acid, palmitic acid, lauric acid and behenic acid; alkali metal salts of the higher fatty acids; sulfuric ester salts of higher alcohols such as stearyl alcohol and oleyl alcohol; anionic surfactants such as sulfuric ester salts of polyethylene glycol ethers, amide-bonded sulfuric ester salts, ester-bonded sulfuric ester salts, ester-bonded sulfonates, amide-bonded sulfonates, ether-bonded sulfonates, ether-bonded alkyl aryl sulfonates, ester-bonded alkyl aryl sulfonates and amide-bonded alkyl aryl sulfonates; phosphates such as acid and alkali metal salts and amine salts of orthophosphoric acid and mono- or di-esters such as oleyl alcohol and stearyl alcohol or mixtures thereof; silane coupling agents such as vinylethoxysilane, vinyl-tris(2-methoxy-ethoxy)silane, γ-methacryloxypropyl trimethoxysilane, γ-aminopropyl trimethoxysilane, β-(3,4-epoxycyclohexyl)ethyl trimethoxysilane, γ-glycidoxypropyl trimethoxysilane and γ-mercaptopropyl trimethoxysilane; titanate-based coupling agents such as isopropyltriisostearoyl titanate, isopropyltris(dioctylpyrophosphate)titanate, isopropyltri(N-aminoethyl-aminoethyl)titanate and isopropyltridecylbenzenesulfonyl titanate; aluminum-based coupling agents such as acetoalkoxyaluminium diisopropylate; and esters of polyhydric alcohols and fatty acids such as glycerin monostearate and glycerin monooleate.

As described above, the acid scavenger can be very effective at preventing acid emissions within the polymer composition even at extremely and surprisingly low concentrations. For instance, the acid scavenger concentration within the polymer composition can be less than about 250 ppm, such as less than about 200 ppm, such as less than about 150 ppm, such as less than about 100 ppm, such as less than about 50 ppm. In one embodiment, for instance, the acid scavenger concentration can be greater than about 20 ppm, such as greater than about 50 ppm, and generally less than about 100 ppm, such as less than about 75 ppm on a weight basis.

As shown above, the acid scavengers of the present disclosure have been found to be highly efficient in terms of required dosage in order to prevent the formation and/or release of acid from the polymer composition, such as hydrochloric acid. Having to incorporate lesser amounts of the acid scavenger into the polymer composition leads to less impact on polymer processing and on the final polymer properties. In addition, the acid scavengers are insoluble in the plasticizer and solvents used during the process and therefore remain in the polymer products and do not build up in the process. By remaining in the polymer products, the acid scavengers remain active for preventing the release of acids during use of the polymer articles.

In addition to the acid scavenger, the polymer composition of the present disclosure for use in gel processing contains a polyolefin resin, particularly a polyethylene polymer in combination with a plasticizer.

As used herein, a polyethylene polymer refers to a polymer made from over 90% ethylene derived units, such as greater than 95% ethylene derived units, or 100% ethylene derived units. The polyethylene can be a homopolymer or a copolymer, including a terpolymer, having other monomeric units. In one embodiment, the polyethylene particles are made from a high density polyethylene. A high density polyethylene has a density of about 0.93 $g/cm^3$ or greater. The polyethylene used to produce the particles can comprise a high molecular weight polyethylene, a very high molecular weight polyethylene, and/or an ultrahigh molecular weight polyethylene. "High molecular weight polyethylene" refers to polyethylene compositions with weight-average molecular weight of at least about $3\times10^5$ g/mol and, as used herein, is intended to include very-high molecular weight polyethylene and ultra-high molecular weight polyethylene. For purposes of the present specification, the molecular weights referenced herein are determined in accordance with the Margolies equation ("Margolies molecular weight").

"Very-high molecular weight polyethylene" refers to polyethylene compositions with a weight average molecular weight of less than about $3\times10^6$ g/mol and more than about $1\times10^6$ g/mol. In some embodiments, the molecular weight of the very-high molecular weight polyethylene composition is between about $2\times10^6$ g/mol and less than about $3\times10^6$ g/mol.

"Ultra-high molecular weight polyethylene" refers to polyethylene compositions with weight-average molecular weight of at least about $3\times10^6$ g/mol. In some embodiments, the molecular weight of the ultra-high molecular weight polyethylene composition is between about $3\times10^6$ g/mol and about $30\times10^6$ g/mol, or between about $3\times10^6$ g/mol and about $20\times10^6$ g/mol, or between about $3\times10^6$ g/mol and about $10\times10^6$ g/mol, or between about $3\times10^6$ g/mol and about $6\times10^6$ g/mol.

As described above, in one embodiment, the polyethylene is a homopolymer of ethylene. In another embodiment, the polyethylene may be a copolymer. For instance, the polyethylene may be a copolymer of ethylene and another olefin containing from 3 to 16 carbon atoms, such as from 3 to 10 carbon atoms, such as from 3 to 8 carbon atoms. These other olefins include, but are not limited to, propylene, 1-butene, 1-pentene, 1-hexene, 1-heptene, 1-octene, 4-methylpent-1-ene, 1-decene, 1-dodecene, 1-hexadecene and the like. Also utilizable herein are polyene comonomers such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene. However, when present, the amount of the non-ethylene monomer(s) in the copolymer may be less than about 10 mol. %, such as less than about 5 mol. %, such as less than about 2.5 mol. %, such as less than about 1 mol. %, wherein the mol. % is based on the total moles of monomer in the polymer.

In one embodiment, the polyethylene may have a monomodal molecular weight distribution. Alternatively, the polyethylene may exhibit a bimodal molecular weight distribution. For instance, a bimodal distribution generally refers to a polymer having a distinct higher molecular weight and a distinct lower molecular weight (e.g. two distinct peaks) on a size exclusion chromatography or gel permeation chromatography curve. In another embodiment, the polyethylene may exhibit more than two molecular weight distribution peaks such that the polyethylene exhibits a multimodal (e.g., trimodal, tetramodal, etc.) distribution. Alternatively, the polyethylene may exhibit a broad molecular weight distribution wherein the polyethylene is comprised of a blend of higher and lower molecular weight components such that the size exclusion chromatography or gel permeation chromatography curve does not exhibit at least two distinct peaks but instead exhibits one distinct peak broader than the individual component peaks.

In one embodiment, the composition may be comprised of more than one polyethylene, each having a different molecular weight and/or molecular weight distribution. For instance, the molecular weight distribution may be within the average molecular weight specifications provided above.

In addition, the composition may be comprised of a blend of one or more polyethylene polymers or copolymers and another thermoplastic polymer such as a polypropylene, a polybutylene, a polymethylpentene, a linear low density polyethylene, or mixtures thereof. However, the amount of non-polyethylene polymer(s) in the composition may be less than about 10 wt. %, such as less than about 5 wt. %, such as less than about 2.5 wt. %, such as less than about 1 wt. %, wherein the wt % is based on the total weight of the composition.

Any method known in the art can be utilized to synthesize the polyethylene. The polyethylene powder is typically produced by the catalytic polymerization of ethylene monomer or optionally with one or more other 1-olefin co-monomers, the 1-olefin content in the final polymer being less or equal to 10% of the ethylene content, with a heterogeneous catalyst and an organo aluminum or magnesium compound as cocatalyst. The ethylene is usually polymerized in gaseous phase or slurry phase at relatively low temperatures and pressures. The polymerization reaction may be carried out at a temperature of between 50° C. and 100° C. and pressures in the range of 0.02 and 2 MPa.

The molecular weight of the polyethylene can be adjusted by adding hydrogen. Altering the temperature and/or the type and concentration of the co-catalyst may also be used to fine tune the molecular weight. Additionally, the reaction may occur in the presence of antistatic agents to avoid fouling and product contamination.

Suitable catalyst systems include but are not limited to Ziegler-Natta type catalysts. Typically Ziegler-Natta type catalysts are derived by a combination of transition metal compounds of Groups 4 to 8 of the Periodic Table and alkyl or hydride derivatives of metals from Groups 1 to 3 of the Periodic Table. Transition metal derivatives used usually comprise the metal halides or esters or combinations thereof. Exemplary Ziegler-Natta catalysts include those based on the reaction products of organo aluminum or magnesium compounds, such as for example but not limited to aluminum or magnesium alkyls and titanium, vanadium or chromium halides or esters. The heterogeneous catalyst might be either unsupported or supported on porous fine grained materials, such as silica or magnesium chloride. Such support can be added during synthesis of the catalyst or may be obtained as a chemical reaction product of the catalyst synthesis itself.

In one embodiment, a suitable catalyst system can be obtained by the reaction of a titanium(IV) compound with a trialkyl aluminum compound in an inert organic solvent at temperatures in the range of −40° C. to 100° C., preferably −20° C. to 50° C. The concentrations of the starting materials are in the range of 0.1 to 9 mol/L, preferably 0.2 to 5 mol/L, for the titanium(IV) compound and in the range of 0.01 to 1 mol/L, preferably 0.02 to 0.2 mol/L for the trialkyl aluminum compound. The titanium component is added to the aluminum component over a period of 0.1 min to 60 min, preferably 1 min to 30 min, the molar ratio of titanium and aluminum in the final mixture being in the range of 1:0.01 to 1:4.

In another embodiment, a suitable catalyst system is obtained by a one or two-step reaction of a titanium(IV) compound with a trialkyl aluminum compound in an inert organic solvent at temperatures in the range of −40° C. to 200° C., preferably −20° C. to 150° C. In the first step the titanium(IV) compound is reacted with the trialkyl aluminum compound at temperatures in the range of −40° C. to 100° C., preferably −20° C. to 50° C. using a molar ratio of titanium to aluminum in the range of 1:0.1 to 1:0.8. The concentrations of the starting materials are in the range of 0.1 to 9.1 mol/L, preferably 5 to 9.1 mol/L, for the titanium (IV) compound and in the range of 0.05 and 1 mol/L, preferably 0.1 to 0.9 mol/L for the trialkyl aluminum compound. The titanium component is added to the aluminum compound over a period of 0.1 min to 800 min, preferably 30 min to 600 min. In a second step, if applied, the reaction product obtained in the first step is treated with a trialkyl aluminum compound at temperatures in the range of −10° C. to 150° C., preferably 10° C. to 130° C. using a molar ratio of titanium to aluminum in the range of 1:0.01 to 1:5.

In yet another embodiment, a suitable catalyst system is obtained by a procedure wherein, in a first reaction stage, a magnesium alcoholate is reacted with a titanium chloride in an inert hydrocarbon at a temperature of 50° to 100° C. In a second reaction stage the reaction mixture formed is subjected to heat treatment for a period of about 10 to 100 hours at a temperature of 110° to 200° C. accompanied by evolution of alkyl chloride until no further alkyl chloride is evolved, and the solid is then freed from soluble reaction products by washing several times with a hydrocarbon.

In a further embodiment, catalysts supported on silica, such as for example the commercially available catalyst system Sylopol 5917 can also be used.

Using such catalyst systems, the polymerization is normally carried out in suspension at low pressure and temperature in one or multiple steps, continuous or batch. The polymerization temperature is typically in the range of 30° C. to 130° C., preferably is the range of 50° C. and 90° C. and the ethylene partial pressure is typically less than 10 MPa, preferably 0.05 and 5 MPa. Trialkyl aluminums, like for example but not limited to isoprenyl aluminum and triisobutyl aluminum, are used as co-catalyst such that the ratio of Al:Ti (co-catalyst versus catalyst) is in the range of 0.01 to 100:1, more preferably is the range of 0.03 to 50:1. The solvent is an inert organic solvent as typically used for Ziegler type polymerizations. Examples are butane, pentane, hexane, cyclohexene, octane, nonane, decane, their isomers and mixtures thereof. The polymer molecular mass is controlled through feeding hydrogen. The ratio of hydrogen partial pressure to ethylene partial pressure is in the range of 0 to 50, preferably the range of 0 to 10. The polymer is isolated and dried in a fluidized bed drier under nitrogen. The solvent may be removed through steam distillation in case of using high boiling solvents. Salts of long chain fatty acids may be added as a stabilizer. Typical examples are calcium, magnesium and zinc stearate.

Optionally, other catalysts such as Phillips catalysts, metallocenes and post metallocenes may be employed. Generally a cocatalyst such as alumoxane or alkyl aluminum or alkyl magnesium compound is also employed. Other suitable catalyst systems include Group 4 metal complexes of phenolate ether ligands.

In accordance with the present disclosure, the polyethylene polymer is formed into particles and combined with a plasticizer. In one embodiment, the polyethylene particles are made from a polyethylene polymer having a relatively low bulk density as measured according to DIN53466. For instance, in one embodiment, the bulk density is generally less than about 0.4 g/cm$^3$, such as less than about 0.35 g/cm$^3$, such as less than about 0.33 g/cm$^3$, such as less than about 0.3 g/cm$^3$, such as less than about 0.28 g/cm$^3$, such as less than about 0.26 g/cm$^3$. The bulk density is generally greater than about 0.1 g/cm$^3$, such as greater than about 0.15 g/cm$^3$. In one embodiment, the polymer has a bulk density of from about 0.2 g/cm$^3$ to about 0.27 g/cm$^3$.

In one embodiment, the polyethylene particles can be a free-flowing powder. The particles can have a median particle size (d50) of less than 200 microns. For example, the median particle size (d50) of the polyethylene particles can be less than about 150 microns, such as less than about 100 microns. The median particle size (d50) is generally greater than about 60 microns. The powder particle size can be measured utilizing a laser diffraction method according to ISO 13320.

In one embodiment, 90% of the polyethylene particles can have a particle size of less than about 250 microns. In other embodiments, 90% of the polyethylene particles can have a particle size of less than about 200 microns, such as less than about 170.

The molecular weight of the polyethylene polymer can vary depending upon the particular application. The polyethylene polymer, for instance, may have an average molecular weight, as determined according to the Margolies equation. The molecular weight can be determined by first measuring the viscosity number according to DIN EN ISO Test 1628. Dry powder flow is measured using a 25 mm nozzle. The molecular weight is then calculated using the Margolies equation from the viscosity numbers, of at least or greater than about 500,000 g/mol, such as greater than about 1,000,000 g/mol, such as greater than about 1,500,000 g/mol, such as greater than about 2,000,000 g/mol, such as greater than about 2,500,000 g/mol, such as greater than about 3,000,000 g/mol, such as greater than about 3,500,000 g/mol, such as greater than about 4,000,000 g/mol. The average molecular weight is generally less than about 12,000,000 g/mol, such as less than about 10,000,000.

The polyethylene may have a viscosity number of from at least 100 mL/g, such as at least 500 mL/g, such as at least 1,500 mL/g, such as at least 2,000 mL/g, such as at least 4,000 mL/g to less than about 6,000 mL/g, such as less than about 5,000 mL/g, such as less than about 4000 mL/g, such as less than about 3,000 mL/g, such as less than about 1,000 mL/g, as determined according to ISO 1628 part 3 utilizing a concentration in decahydronapthalene of 0.0002 g/mL.

The polyethylene may have a crystallinity of from at least about 40% to 85%, such as from 45% to 80%.

In order to form polymer articles through a gel spinning or extruding process, the polyethylene particles as described above are combined with the acid scavenger and a plasticizer to form a polymer composition. In general, the polyethylene particles are present in the polymer composition in an amount up to about 50% by weight. For instance, the polyethylene particles can be present in the polymer composition in an amount less than about 45% by weight, such as in an amount less than about 40% by weight, such as in an amount less than about 35% by weight, such as in an amount less than about 30% by weight, such as in an amount less than about 25% by weight, such as in an amount less than about 20% by weight, such as in an amount less than about 15% by weight, such as in an amount less than about 10% by weight, such as in an amount less than about 5% by weight. The polyethylene particles can be present in the composition in an amount greater than about 1% by weight, such as in an amount greater than about 3% by weight, such as in an amount greater than about 5% by weight, such as in an amount greater than about 10% by weight, such as in an amount greater than about 15% by weight, such as in an amount greater than about 20% by weight, such as in an amount greater than about 25% by weight. During gel processing, the plasticizer can be substantially or completely removed in forming polymer articles. For example, in one embodiment, the resulting polymer article can contain the polyethylene polymer in an amount greater than about 70% by weight, such as in an amount greater than about 80% by weight, such as in an amount greater than about 85% by weight, such as in an amount greater than about 90% by weight, such as in an amount greater than about 95% by weight, such as in an amount greater than about 98% by weight, such as in an amount greater than about 99% by weight.

Because the acid scavenger is generally insoluble in the plasticizer and/or any extraction solvents used during the process, the acid scavenger remains in the polymer article formed from the polyethylene polymer. Thus, polymer articles made in accordance with the present disclosure can contain one or more acid scavengers in accordance with the present disclosure in an amount greater than about 10 ppm, such as in an amount greater than about 20 ppm, such as in an amount greater than about 30 ppm and generally in an amount less than about 250 ppm, such as in an amount less than about 150 ppm on a weight basis.

In general, any suitable plasticizer can be combined with the polyethylene particles as long as the plasticizer is capable of forming a gel-like material suitable for gel spinning or extruding. The plasticizer, for instance, may comprise a hydrocarbon oil, an alcohol, an ether, an ester such as a diester, or mixtures thereof. For instance, suitable plasticizers include mineral oil, a paraffinic oil, decaline, and the like. Other plasticizers include xylene, dioctyl phthalate, dibutyl phthalate, stearyl alcohol, oleyl alcohol, decyl alcohol, nonyl alcohol, diphenyl ether, n-decane, n-dodecane, octane, nonane, kerosene, toluene, naphthalene, tetraline, and the like. In one embodiment, the plasticizer may comprise a halogenated hydrocarbon, such as monochlorobenzene. Cycloalkanes and cycloalkenes may also be used, such as camphene, methane, dipentene, methylcyclopentandiene, tricyclodecane, 1,2,4,5-tetramethyl-1,4-cyclohexadiene, and the like. The plasticizer may comprise mixtures and combinations of any of the above as well.

The plasticizer is generally present in the composition used to form the polymer articles in an amount greater than about 50% by weight, such as in an amount greater than about 55% by weight, such as in an amount greater than about 60% by weight, such as in an amount greater than about 65% by weight, such as in an amount greater than about 70% by weight, such as in an amount greater than about 75% by weight, such as in an amount greater than about 80% by weight, such as in an amount greater than about 85% by weight, such as in an amount greater than about 90% by weight, such as in an amount greater than about 95% by weight, such as in an amount greater than about 98% by weight. In fact, the plasticizer can be present in an amount up to about 99.5% by weight.

The polyethylene particles blend with the plasticizer to form a homogeneous gel-like material.

In order to form polymer articles in accordance with the present disclosure, the polyethylene particles are combined with the acid scavenger and the plasticizer and extruded through a die of a desired shape. In one embodiment, the composition can be heated within the extruder. For example, the plasticizer can be combined with the polyethylene particles and fed into an extruder. In accordance with the present disclosure, the plasticizer and polyethylene particles form a homogeneous gel-like material prior to leaving the extruder for forming polymer articles with little to no impurities.

In one embodiment, elongated articles are formed during the gel spinning or extruding process. The polymer article, for instance, may be in the form of a fiber, a film, or a membrane.

During the process, at least a portion of the plasticizer is removed from the final product. The plasticizer removal process may occur due to evaporation when a relatively volatile plasticizer is used. Otherwise, an extraction liquid can be used to remove the plasticizer. The extraction liquid may comprise, for instance, a hydrocarbon solvent. One example of the extraction liquid, for instance, is dichloromethane. In accordance with the present disclosure, the acid scavenger is both insoluble in the plasticizer and the extraction solvent. In one embodiment, evaporation and extraction are both used.

If desired, the resulting polymer article can be stretched at an elevated temperature below the melting point of the polyethylene polymer to increase strength and modulus. Suitable temperatures for stretching are in the range of from about ambient temperature to about 155° C. The draw ratios can generally be greater than about 4, such as greater than about 6, such as greater than about 8, such as greater than about 10, such as greater than about 15, such as greater than about 20, such as greater than about 25, such as greater than about 30. In certain embodiments, the draw ratio can be greater than about 50, such as greater than about 100, such as greater than about 110, such as greater than about 120, such as greater than about 130, such as greater than about 140, such as greater than about 150. Draw ratios are generally less than about 1,000, such as less than about 800, such as less than about 600, such as less than about 400. In one embodiment, lower draw ratios are used such as from about 4 to about 10. The polymer article can be uniaxially stretched or biaxially stretched.

Polymer articles made in accordance with the present disclosure have numerous uses and applications. For example, in one embodiment, the process is used to produce a membrane. The membrane can be used, for instance, as a battery separator. Alternatively, the membrane can be used as a microfilter. When producing fibers, the fibers can be used to produce nonwoven fabrics, ropes, nets, and the like. In one embodiment, the fibers can be used as a filler material in ballistic apparel.

The polymer composition and polymer articles made in accordance with the present disclosure may contain various other additives, such as heat stabilizers, light stabilizers, UV absorbers, flame retardants, lubricants, colorants, and the like.

In one embodiment, a heat stabilizer may be present in the composition. The heat stabilizer may include, but is not limited to, phosphites, aminic antioxidants, phenolic antioxidants, or any combination thereof.

In one embodiment, an antioxidant may be present in the composition. The antioxidant may include, but is not limited to, secondary aromatic amines, benzofuranones, sterically hindered phenols, or any combination thereof.

In one embodiment, a light stabilizer may be present in the composition. The light stabilizer may include, but is not limited to, 2-(2'-hydroxyphenyl)-benzotriazoles, 2-hydroxy-4-alkoxybenzophenones, nickel containing light stabilizers, 3,5-di-tert-butyl-4-hydroxbenzoates, sterically hindered amines (HALS), or any combination thereof.

In one embodiment, a UV absorber may be present in the composition in lieu of or in addition to the light stabilizer. The UV absorber may include, but is not limited to, a benzotriazole, a benzoate, or a combination thereof, or any combination thereof.

In one embodiment, a halogenated flame retardant may be present in the composition. The halogenated flame retardant may include, but is not limited to, tetrabromobisphenol A (TBBA), tetrabromophthalic acid anhydride, dedecachloropentacyclooctadecadiene (dechlorane), hexabromocyclododecane, chlorinated paraffins, or any combination thereof.

In one embodiment, a non-halogenated flame retardant may be present in the composition. The non-halogenated flame retardant may include, but is not limited to, resorcinol diphosphoric acid tetraphenyl ester (RDP), ammonium polyphosphate (APP), phosphine acid derivatives, triaryl phosphates, trichloropropylphosphate (TCPP), magnesium hydroxide, aluminum trihydroxide, antimony trioxide.

In one embodiment, a lubricant may be present in the composition. The lubricant may include, but is not limited to, silicone oil, waxes, molybdenum disulfide, or any combination thereof.

In one embodiment, a colorant may be present in the composition. The colorant may include, but is not limited to, inorganic and organic based color pigments.

These additives may be used singly or in any combination thereof. In general, unless stated otherwise, if the additives are utilized, they may be present in an amount of at least about 0.05 wt. %, such as at last about 0.1 wt. %, such as at least about 0.25 wt. %, such as at least about 0.5 wt. %, such as at least about 1 wt. % and generally less than about 20 wt. %, such as less than about 10 wt. %, such as less than about 5 wt. %, such as less than about 4 wt. %, such as less than about 2 wt. %. The sum of the wt. % of all of the components, including any additives if present, utilized in the polymer composition will be 100 wt. %.

The present disclosure may be better understood with reference to the following example. The following example is given below by way of illustration and not by way of limitation. The following experiments were conducted in order to show some of the benefits and advantages of the present invention.

Example 1

Various different polymer compositions were formulated containing high density polyethylene particles, a plasticizer, and an acid scavenger. Acid scavengers made in accordance with the present disclosure were compared with the use of calcium stearate as an acid scavenge.

More particularly, the acid scavenger, calcium stearate, was compared with the use of magnesium aluminum hydroxide carbonates obtained from different commercial sources. For instance, the magnesium aluminum hydroxide carbonates tested included HYCITE 713 obtained from Clariant, DHT-4A obtained from Kisuma Chemical, and DHT-4A-2 also obtained from Kisuma Chemical. HYCITE 713 has a magnesium oxide to aluminum oxide mole ratio of from about 4 to about 5 mol/mol. DHT-4A has a magnesium oxide to aluminum oxide ratio of 4.3 mol/mol. DHT-4A-2 is the dehydrated form of DHT-4A.

The above acid scavengers were combined with polyethylene particles. The polyethylene particles had a molecular weight of 700,000 g/mol and had a $D_{50}$ particle size of 115 micrometers.

The blended formulations containing the different acid scavengers were then tested for acid release. In particular, the polymer compositions were heated to a temperature which triggers the release of hydrochloric acid. After a certain amount of time, the amount of hydrochloric acid released from the sample was determined using the gas detecting system available from Draeger Safety AG & Co. KGaA. Any detection of hydrochloric acid indicated an insufficient amount of acid scavenger present.

The following results were obtained:

| Sample No. | Acid scavenger type | Acid scavenger Loading in ppm | HCl release during Draeger test in ppm |
|---|---|---|---|
| 1 | none | none | 2.5 |
| 2 | Calcium Stearate | 200 | 0.2 |
| 3 | Calcium Stearate | 500 | 0 |
| 4 | Magnesium aluminum hydroxide carbonate ($MgO/Al_2O_3$ = 4-5 mol/mol) | 75 | 0 |
| 5 | Magnesium aluminum hydroxide carbonate ($MgO/Al_2O_3$ = 4-5 mol/mol) | 50 | 0 |
| 6 | Magnesium aluminum hydroxide carbonate ($MgO/Al_2O_3$ = 4.3 mol/mol) | 75 | 0 |
| 7 | Magnesium aluminum hydroxide carbonate ($MgO/Al_2O_3$ = 4.3 mol/mol) | 50 | 0 |
| 8 | Magnesium aluminum hydroxide carbonate dehydrated ($MgO/Al_2O_3$ = 4.3 mol/mol) | 75 | 0 |
| 9 | Magnesium aluminum hydroxide carbonate dehydrated ($MgO/Al_2O_3$ = 4.3 mol/mol) | 50 | 0.1 |

As shown above, the acid scavengers of the present disclosure are capable of preventing acid release at unexpectedly low concentrations. Although unknown, it is believed that the acid scavengers of the present disclosure synergistically blend with the polyethylene particles and the plasticizer during polymer processing to improve the efficiency of the chemical compound.

Example 2

The following example demonstrates the corrosion resistant properties of compositions made in accordance with the present disclosure.

Carbon steel type 1.1274 was coated with various different polymer compositions that were formulated containing high density polyethylene particles and an acid scavenger. Acid scavengers in accordance with the present disclosure were compared with the use of calcium stearate.

Carbon steel strips having dimensions of 0.2 mm thick, 10 mm wide, and 50 mm long were tested. The carbon steel samples were initially cleaned with acetone and weighted before being placed in a compression mold together with 100 g of a polymer formulation, followed by being heated for 50 minutes to a temperature of 250° C. at a pressure of 5 bars. The samples were then allowed to cool and placed in water vapor for one hour. They were weighted once more after drying.

Each polymer formulation contained an acid scavenger. The acid scavenger, calcium stearate, was compared with a hydrotalcite. The hydrotalcite (magnesium aluminum hydroxide carbonate) tested was DHT-4A obtained from Kisuma Chemical. DHT-4A has a magnesium oxide to aluminum oxide mole ratio of 4.3 mol/mol.

The above acid scavengers were combined with polyethylene particles and a plasticizer in an amount ranging from 0 to 1000 ppm. The polyethylene particles have a molecular weight of 700,000 g/mol (Margolies' Equation) and had a $D_{50}$ particle size of 115 micrometers.

The following results were obtained:

| Base Resin | Additive | Loading of Acid Scavenger in ppm | Steel type | Average weight % increase |
|---|---|---|---|---|
| UHMW Polyethylene | None | 0 | 1.1274 C-Steel | 0.2253 |
| UHMW Polyethylene | Ca-St | 200 | 1.1274 C-Steel | 0.1115 |
| UHMW Polyethylene | Ca-St | 500 | 1.1274 C-Steel | 0.0424 |
| UHMW Polyethylene | Ca-St | 700 | 1.1274 C-Steel | 0.0182 |
| UHMW Polyethylene | Ca-St | 700 | 1.1274 C-Steel | 0.0290 |
| UHMW Polyethylene | Ca-St | 1000 | 1.1274 C-Steel | 0.0261 |
| UHMW Polyethylene | Hydrotalcite | 100 | 1.1274 C-Steel | 0.1546 |
| UHMW Polyethylene | Hydrotalcite | 150 | 1.1274 C-Steel | 0.0373 |
| UHMW Polyethylene | Hydrotalcite | 200 | 1.1274 C-Steel | 0.0090 |

As shown above, much less hydrotalcite is needed for corrosion protection. In addition, the hydrotalcite provided greater corrosion prevention.

Example 3

The following example was conducted to demonstrate that polymer compositions made in accordance with the present disclosure produce less extractables in comparison to calcium stearate when contacted with dichloromethane.

Various different polymer compositions were formulated and gel extruded containing high density polyethylene particles and an acid scavenger. Dichloromethane was used as an extracting solvent after the molding process. Acid scavengers made in accordance with the present disclosure were compared with the use of calcium stearate.

More particularly, the acid scavenger, calcium stearate, was compared with the use of magnesium aluminum hydroxide carbonates obtained from different commercial sources. In the present example, the magnesium aluminum hydroxide carbonates tested included HYCITE 713 obtained from Clariant, and DHT-4A obtained from Kisuma Chemical. HYCITE 713 has a magnesium oxide to aluminum oxide mole ratio of from about 4 to about 5 mol/mol. DHT-4A has a magnesium oxide to aluminum oxide ratio of 4.3 mol/mol.

The above acid scavengers were combined with polyethylene particles in an amount ranging from 0 to 500 ppm. Calcium stearate was combined with polyethylene particles having a molecular weight of 600,000 g/mol and a $D_{50}$ particle size of 110 microns. The hydrotalcite additives were combined with a polyethylene having a molecular weight of 1,700,000 g/mol and a $D_{50}$ particle size of 135 microns.

The amount of additive in each polymer composition was measured after extraction. The following results were obtained:

| Resin | Type of additive | PPM of additive | % of additive remaining in resin after extraction |
|---|---|---|---|
| UHMW Polyethylene | Hydrotalcite[1] | 110 | 94 |
| UHMW Polyethylene | Hydrotalcite[2] | 110 | 89 |
| UHMW Polyethylene | Ca-St | 500 | 79 |
| UHMW Polyethylene | Ca-St | 500 | 79 |

[1]magnesium oxide to aluminum oxide ratio of 4.3 mol/mol

[2]magnesium oxide to aluminum oxide mol ratio of from about 4 to about 5 mol/mol These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing descriptions is by way of example only, and is not intended to limit the invention so further described in such appended claims.

What is claimed:

1. A polymer composition for producing gel extruded articles comprising:

a plasticizer;

high density polyethylene particles combined with the plasticizer, and an acid scavenger, the acid scavenger comprising an inorganic compound that is insoluble in the plasticizer, the inorganic compound comprising an oxide, a carbonate, a silicate, or mixtures thereof, and wherein the acid scavenger is present in the polymer composition in an amount less than about 150 ppm on a weight basis.

2. A polymer composition as defined in claim 1, wherein the acid scavenger comprises a carbonate.

3. A polymer composition as defined in claim 1, wherein the acid scavenger comprises a hydrotalcite.

4. A polymer composition as defined in claim 1, wherein the acid scavenger is present in the composition in an amount less than about 100 ppm on a weight basis.

5. A polymer composition as defined in claim 1, wherein the high density polyethylene particles are present in the composition in an amount up to about 50% by weight.

6. A polymer composition as defined in claim 1, wherein the plasticizer comprises mineral oil, a paraffinic oil, a hydrocarbon, an alcohol, an ether, an ester, or mixtures thereof.

7. A polymer composition as defined in claim 1, wherein the high density polyethylene has a molecular weight of greater than about 2,000,000 g/mol.

8. A polymer composition as defined in claim 1, wherein the high density polyethylene is a Ziegler-Natty catalyzed ultrahigh molecular weight polyethylene.

9. A polymer composition as defined in claim 1, wherein the plasticizer comprises decaline, xylene, dioctyl phthalate, dibutyl phthalate, stearyl alcohol, oleyl alcohol, decyl alcohol, nonyl alcohol, diphenyl ether, n-decane, n-dodecane, octane, nonane, kerosene, toluene, naphthalene, tetraline, monochlorobenzene, camphene, methane, dipentene, methylcyclopentandiene, tricyclodecane, 1,2,4,5-tetramethyl-1,4-cyclohexadiene, or mixtures thereof.

10. A process for producing polymer articles comprising:

forming the polymer composition as defined in claim 1 into a gel-like composition;

extruding the gel-like composition through a die to form a polymer article, the polymer article comprising fibers, a film, or a membrane.

11. A process as defined in claim 10, further comprising the step of removing at least part of the plasticizer from the polymer article.

12. A process as defined in claim 10, wherein the resulting polymer article contains the acid scavenger in an amount greater than about 10 ppm.

13. A process as defined in claim 10, wherein an extraction solvent is added to the polymer composition during the process in order to facilitate removal of the plasticizer from the polymer article, the acid scavenger being insoluble in the extraction solvent.

14. A process as defined in claim 13, wherein the extraction solvent comprises dichloromethane.

15. A polymer composition for producing gel extruded articles comprising:

a plasticizer;

high density polyethylene particles combined with the plasticizer, and an acid scavenger, the acid scavenger comprising an inorganic compound that is insoluble in the plasticizer, the inorganic compound comprising an oxide, a carbonate, a silicate, or mixtures thereof, and wherein the plasticizer is present in the polymer composition in an amount greater than about 90% by weight.

* * * * *